United States Patent [19]

Woo

[11] 4,219,364
[45] Aug. 26, 1980

[54] SULFUR FOAM PROCESS AND PRODUCT

[75] Inventor: Gar L. Woo, Tiburon, Calif.

[73] Assignee: Chevron Research Company, San Francisco, Calif.

[21] Appl. No.: 969,119

[22] Filed: Dec. 13, 1978

Related U.S. Application Data

[63] Continuation of Ser. No. 672,202, Mar. 31, 1976.

[51] Int. Cl.² .......................... C08K 3/06; C09K 3/00
[52] U.S. Cl. ............................... 106/122; 106/287.34
[58] Field of Search ................... 106/122, 70, 287.34

[56] References Cited

U.S. PATENT DOCUMENTS

| | | | |
|---|---|---|---|
| 1,636,596 | 7/1927 | Ellis | 260/48 |
| 3,337,355 | 8/1967 | Dale et al. | 106/70 |
| 3,353,978 | 11/1967 | Davie | 106/275 |
| 3,434,852 | 3/1969 | Louthan | 106/19 |
| 3,674,525 | 7/1972 | Louthan | 260/79 |
| 3,965,067 | 6/1976 | Jin | 106/19 |
| 4,022,857 | 5/1977 | Dale et al. | 106/70 |

*Primary Examiner*—Theodore Morris
*Attorney, Agent, or Firm*—D. A. Newell; John Stoner, Jr.; A. T. Bertolli

[57] ABSTRACT

A process for producing a sulfur foam containing at least 50 weight percent sulfur which comprises contacting and reacting molten sulfur with phenol or an aliphatic polysulfide to thereby obtain a phenol-sulfur adduct or an aliphatic polysulfide-sulfur adduct and contacting and reacting the adduct with maleic anhydride at a temperature between about 100° and 190° C. to thereby obtain a sulfur foam. In the case of phenol, preferably the phenol is reacted with the sulfur in the presence of a hydroxide base.

12 Claims, No Drawings

SULFUR FOAM PROCESS AND PRODUCT

CROSS-REFERENCE TO RELATED APPLICATION

This application is a continuation of U.S. Ser. No. 672,202, filed Mar. 31, 1976.

BACKGROUND OF THE INVENTION

The present invention relates to sulfur foams.

A recent patent issued to Dale and Ludwig, U.S. Pat. No. 3,337,355, discloses the production of a sulfur foam using the following steps:
 (a) heating sulfur to above its melting point;
 (b) blending a stabilizing agent with the molten sulfur;
 (c) blending a viscosity increaser with the molten sulfur, steps (b) and (c) being taken in either order with respect to the other;
 (d) forming bubbles in the molten sulfur, and
 (e) cooling the molten sulfur to below its melting point.

My commonly assigned patent application Ser. No. 344,694, discloses the preparation of sulfur foams using sulfur plus an aromatic composition such as phenol plus an acid and a polyisocyanate. My commonly assigned application Ser. No. 438,508 discloses preparation of a sulfur foam using sulfur plus an acid plus a polyisocyanate; the sulfur can be plasticized, if desired, for example using an aliphatic compound.

Proceedings, National Academy of Sciences, U.S.A., 46, 822 (1960) and Jo. Chem. Eng. Data 8, No. 4, 620 (Oct. 1963) disclose that maleic anhydride and some other anhydrides are sensitive to decomposition and will liberate a gas upon exposure to a base at a temperature above about 90° C. See also Quarterly Reports on Sulfur Chemistry, 5, No. 3, 212 (1970)—Fourth Organic Sulfur Symposium, Venice, Italy, which discloses the reaction of sulfur with maleic anhydride to give a black polymer with $H_2S$ evolution.

SUMMARY OF THE INVENTION

According to the present invention, a process is provided for producing sulfur foam containing at least 50 weight percent sulfur which comprises contacting and reacting molten sulfur with phenol or an aliphatic polysulfide to thereby obtain a phenol-sulfur adduct or an aliphatic polysulfide-sulfur adduct and contacting and reacting the adduct with maleic anhydride at a temperature between about 100° and 190° C. to thereby obtain a sulfur foam.

In the case of phenol, preferably the phenol is reacted with sulfur in the presence of a hydroxide base to form the phenol-sulfur adduct, and preferably a portion or all of the hydroxide base is left in the phenol-sulfur adduct which is reacted with the maleic anhydride. The phenol should be reacted with at least 2 mols sulfur per mol phenol, preferably 2 to 9 mols sulfur per mol of phenol.

Among other factors, the present invention is based on my finding that maleic anhydride reacts with a phenol-sulfur adduct or an aliphatic polysulfide-sulfur adduct, containing predominantly sulfur, to form a sulfur foam, whereas surprisingly by comparison, maleic anhydride was not found to form a foam when reacted with an aniline-sulfur adduct consisting predominantly of sulfur. In the sulfur foams formed by the present invention I have found that preferably the phenol-sulfur adduct is prepared using a hydroxide base, and at least a portion of this hydroxide base is left in the phenol-sulfur adduct.

Preferred hydroxide bases include calcium, potassium, and sodium hydroxides and the like; sodium hydroxide is especially preferred.

Preferred amounts of constituents used to form the phenol-sulfur adduct include 1 to 45 weight percent phenol; at least 50 weight percent sulfur (for example, 60 to 90 weight percent sulfur); and 0.01 to 2.0 weight percent sodium hydroxide. Particularly preferred amounts of sodium hydroxide are between 0.05 and 0.5 weight percent, the above weight percents being based on the overall phenol-sulfur adduct.

An aliphatic polysulfide can be used in amounts similar to the phenol. Preferred aliphatic polysulfides are aliphatic disulfides, trisulfides, and tetrasulfides (usually the disulfide) which can be produced by the reaction of a sodium polysulfide, such as sodium disulfide, etc., with an organic, usually an aliphatic, dihalide. Among the halides which have been employed are methylene dichloride, ethylene dichloride, propylene dichloride, glycerol dichlorohydrin, epichlorohydrin, dichloroethyl ether, dichloromethyl formal, dichloroethyl formal, and triglycol dichloride. The reactants may include minor amounts of trifunctional or tetrafunctional halides, the presence of which will cause cross-linking and increase the viscosity of the resulting polymers. Usually not more than about 10%, preferably about 2%, cross-linking is preferred.

Particularly preferred materials are those which are termed polysulfide liquid polymers marketed by the Thiokol Corporation under the designations LP-2, LP-3 and LP-32. These liquid polymers generally have thiol end groups and molecular weights in the range of from about 500 to 10,000, usually about 1000 to about 8000. The polysulfide materials are also described as polyalkylenepolysulfides, or polythiomercaptans, or where the dihalide monomer is predominantly ether and/or formal, etc., a polyoxyalkylenepolysulfide. An exemplary patent describing these polyalkylenepolysulfides is U.S. Pat. No. 3,306,000.

Preferably the foam of the present invention is formed using phenol, as I have found the phenol formed foams to be superior in terms of uniform cell structure and foam stability. However, the aliphatic polysulfide-sulfur adduct is advantageous when a rubbery foam is desired.

Preferably the adduct is formed at a temperature between about 110° and 180° C. Also it is preferred to combine the adduct with the maleic anhydride at a temperature between 110° and 160° C. In combining the phenol-sulfur adduct with maleic anhydride a reaction is believed to occur. This is based, among other factors, on my finding that the resultant foam appears to rigidify, indicating cross-linking reactions between the maleic anhydride and the phenol-sulfur, as opposed to the foam being relatively soft immediately following the formation of the foam, which would indicate more of a mere physical mixture of the decomposed maleic anhydride in the foam.

Preferably there is incorporated in the phenol-sulfur adduct prior to its reaction with the maleic anhydride an amount of talc between about 0.5 to 25 weight percent based on the overall foam composition.

The present invention also contemplates the foams formed by the above-described methods.

EXAMPLE 1

Preparation of a Rubbery Foam

Plasticized sulfur was prepared by heating 241 g of sulfur with 54.6 g of a linear aliphatic polysulfide (Thiokol LP-32) at 140°–145° C. for two hours. To 200 g of this composition at 130° C., there was added 1.0 g of silicone surfactant (Dow Corning DC 193) and 7.0 g of maleic anhydride. After stirring for a short while, the mixture expanded into a foam which occupied about 550 ml upon cooling.

EXAMPLE 2

Preparation of a Rigid Sulfur Foam

A phenol-sulfur adduct was prepared by reacting 7 mols of sulfur with 3 mols of phenol in the presence of sodium hydroxide for 22 hours at 110° C. followed by neutralization with 1 mole of phosphoric acid per every 3 moles of sodium hydroxide. The product was diluted with two times its weight of sulfur and then solidified. To 215 g of this mixture at 129° C., there was added 1.0 g of a silicone surfactant (Dow Corning 193). After stirring, 7.5 g of maleic anhydride was added. The mixture foamed to occupy a volume of 750 ml upon cooling.

EXAMPLE 3

Preparation of Sulfur Foam Catalyzed by Quinoline

The sulfur diluted phenol-sulfur adduct of Example 2, 200 g, was heated to 130° C. Then 1 g of silicone surfactant (DC 193) and 1.5 g of quinoline were added. After the above was well mixed, 7.5 g of maleic anhydride was added. The resulting mixture was stirred until it foamed up to occupy about 550 ml of volume upon cooling to room temperature.

EXAMPLE 4

Preparation of Sulfur Foam with Molten MA

The sulfur diluted phenol-sulfur adduct of Example 2, 150 g, was heated to 130° C. To this there was added a mixture of 2.0 g of quinoline and 1.0 g of silicone surfactant (DC 193). After mixing, 12.6 g of molten maleic anhydride at about 60° C. was added. The resulting mixture foamed to about 1400 ml in volume. Upon cooling some shrinkage occurred. The foam was brittle and black in color.

EXAMPLE 5

Preparation of Sulfur Foam Containing Talc

The sulfur diluted phenol-sulfur adduct of Example 2, 150 g, was heated to 125° C. To this there was added 0.5 g of a silicone surfactant (DC 193) and 15 g of talc (Mistron Vapor) preheated to 140° C. The mixture was stirred until it became homogenous, then 6 g of molten maleic anhydride at 60° C. was added. The resulting foam occupied about 650 ml of volume upon cooling.

The same example was repeated, except that only 3 g of maleic anhydride powder was used. In this case, the resulting foam occupied about 325 ml of volume.

What is claimed is:

1. A process for producing a sulfur foam containing at least 50 weight percent sulfur which comprises first contacting and reacting molten sulfur with phenol or aliphatic polysulfide to thereby obtain a phenol-sulfur adduct or an aliphatic polysulfide-sulfur adduct and then contacting and reacting the adduct with maleic anhydride at a temperature between about 100 and 190° C. to thereby obtain a sulfur foam.

2. A process in accordance with claim 1 wherein phenol is used to form the adduct.

3. A process in accordance with claim 2 wherein the phenol is reacted with sulfur in the presence of a hydroxide base.

4. A process in accordance with claim 3 wherein the hydroxide base is sodium hydroxide.

5. A process in accordance with claim 2 wherein the constituents used to form the phenol-sulfur adduct comprise 1 to 45 weight percent phenol; at least 50 weight percent sulfur; and 0.01 to 2.0 weight percent sodium hydroxide.

6. A process in accordance with claim 5 wherein the phenol-sulfur adduct is formed by reacting phenol with sulfur at a temperature between 110° and 180° C. and wherein the phenol-sulfur adduct is contacted and reacted with maleic anhydride at a temperature between 110° and 160° C.

7. A process in accordance with claim 5 wherein the amount of maleic anhydride reacted with the phenol-sulfur adduct is between 1 and 20 weight percent of the overall foam composition.

8. A process in accordance with claim 7 wherein 0.5 to 25 weight percent talc based on the overall foam composition is combined with the phenol-sulfur adduct before the adduct is reacted with the maleic anhydride.

9. A composition prepared in accordance with the process of claim 1.

10. A composition prepared in accordance with the process of claim 5.

11. A composition prepared in accordance with the process of claim 7.

12. A composition prepared in accordance with the process of claim 8.

* * * * *